United States Patent
Burdis et al.

(10) Patent No.: US 11,488,489 B2
(45) Date of Patent: Nov. 1, 2022

(54) ADAPTIVE LANGUAGE LEARNING

(71) Applicant: Emmersion Learning, Inc, Lehi, UT (US)

(72) Inventors: Jacob Burdis, Rigby, ID (US); Brigham Tomco, Rexburg, ID (US)

(73) Assignee: EMMERSION LEARNING, INC, Lehi, UT (US)

( * ) Notice: Subject to any disclaimer, the term of this patent is extended or adjusted under 35 U.S.C. 154(b) by 224 days.

(21) Appl. No.: 15/922,891

(22) Filed: Mar. 15, 2018

(65) Prior Publication Data

US 2018/0268728 A1 Sep. 20, 2018

Related U.S. Application Data

(60) Provisional application No. 62/471,505, filed on Mar. 15, 2017.

(51) Int. Cl.
| | | |
|---|---|---|
| *G09B 7/04* | (2006.01) | |
| *G09B 19/04* | (2006.01) | |
| *G09B 19/06* | (2006.01) | |
| G09B 5/06 | (2006.01) | |
| G10L 13/00 | (2006.01) | |
| G09B 17/00 | (2006.01) | |
| G09B 7/02 | (2006.01) | |
| G10L 15/26 | (2006.01) | |

(52) U.S. Cl.
CPC ............... *G09B 7/04* (2013.01); *G09B 19/04* (2013.01); *G09B 19/06* (2013.01); *G09B 5/06* (2013.01); *G09B 7/02* (2013.01); *G09B 17/006* (2013.01); *G10L 13/00* (2013.01); *G10L 15/26* (2013.01)

(58) Field of Classification Search
CPC .......... G09B 19/06; G09B 19/04; G09B 7/02; G09B 5/06; G09B 7/04; G09B 17/006; G10L 15/26; G10L 13/00
See application file for complete search history.

(56) References Cited

U.S. PATENT DOCUMENTS

| | | | |
|---|---|---|---|
| 6,755,657 B1* | 6/2004 | Wasowicz | G09B 5/04 434/350 |
| 2003/0028378 A1* | 2/2003 | August | G10L 13/00 704/260 |
| 2004/0176960 A1* | 9/2004 | Shpiro | G09B 19/06 704/277 |
| 2005/0175970 A1* | 8/2005 | Dunlap | G09B 5/06 434/185 |

(Continued)

*Primary Examiner* — Jack Yip
(74) *Attorney, Agent, or Firm* — Kunzler Bean & Adamson

(57) ABSTRACT

A method for adaptive language learning comprises receiving, by a processor, a response from a user in response to a first prompt. The first prompt is intended to test one or more language skills of the user. The method includes analyzing one or more characteristics of the response to determine one or more scores for the response. The one or more scores are determined based on a comparison of the one or more characteristics of the response to a predefined response to the prompt. The method includes determining a language proficiency for the user based on the determined one or more scores. The method includes dynamically selecting a second prompt to present to the user. The second prompt is selected based on the user's language proficiency and intended to further test the user's one or more language skills.

20 Claims, 5 Drawing Sheets

(56) References Cited

U.S. PATENT DOCUMENTS

| | | | | |
|---|---|---|---|---|
| 2006/0111902 A1* | 5/2006 | Julia | ........................ | G10L 15/26 |
| | | | | 704/E15.045 |
| 2008/0306738 A1* | 12/2008 | Lee | ........................ | G09B 19/04 |
| | | | | 704/236 |
| 2009/0204398 A1* | 8/2009 | Du | ........................ | G10L 15/10 |
| | | | | 704/231 |
| 2009/0258333 A1* | 10/2009 | Yu | ........................ | G09B 19/06 |
| | | | | 434/157 |
| 2010/0151427 A1* | 6/2010 | Tsai | ........................ | G09B 19/06 |
| | | | | 434/169 |
| 2014/0186806 A1* | 7/2014 | Hallowell | .............. | G09B 19/04 |
| | | | | 434/167 |
| 2014/0342321 A1* | 11/2014 | Wendt | ........................ | G09B 7/06 |
| | | | | 434/156 |
| 2017/0039869 A1* | 2/2017 | Gleim | ........................ | G09B 5/12 |
| 2018/0108273 A1* | 4/2018 | Nielson | .................. | A61B 5/165 |

* cited by examiner

ADAPTIVE LANGUAGE LEARNING

CROSS-REFERENCES TO RELATED APPLICATIONS

This application claims the benefit of U.S. Provisional Patent Application No. 62/471,505 entitled "LANGUAGE LEARNING" and filed on Mar. 15, 2017, which is incorporated herein by reference.

FIELD

This invention relates to language learning and more particularly relates to dynamically adapting language learning to a user's language proficiency.

BACKGROUND

Learning a language often involves studying the language in a non-personalized fashion using textbooks, study guides, etc. While useful, conventional language learning resources fail to provide immediate and effective feedback on how well a user is progressing in learning the desired language. Furthermore, conventional methods for learning a language are typically not personalized and tailored for the user's skill set, strengths, and weaknesses.

BRIEF SUMMARY

The subject matter of the present application has been developed in response to the present state of the art, and in particular, in response to the problems and disadvantages associated with conventional systems, apparatuses, computer program products, and methods for language learning. Accordingly, the subject matter of the present application has been developed to provide adaptive language learning apparatuses, systems, computer program products, and methods that overcome at least some of the above-discussed shortcomings of prior art techniques.

Described herein is a method for adaptive language learning. The method includes receiving, by a processor, a response from a user in response to a first prompt. The first prompt is intended to test one or more language skills of the user. The method includes analyzing one or more characteristics of the response to determine one or more scores for the response. The one or more scores are determined based on a comparison of the one or more characteristics of the response to a predefined response to the prompt. The method includes determining a language proficiency for the user based on the determined one or more scores. The method includes dynamically selecting a second prompt to present to the user. The second prompt is selected based on the user's language proficiency and intended to further test the user's one or more language skills. The preceding subject matter of this paragraph characterizes example 1 of the present disclosure.

The prompt is one of a plurality of prompts that comprise a language proficiency test. The preceding subject matter of this paragraph characterizes example 2 of the present disclosure, wherein example 2 also includes the subject matter according to example 1, above.

A predefined subset of the plurality of prompts is associated with a predefined language proficiency level. The preceding subject matter of this paragraph characterizes example 3 of the present disclosure, wherein example 3 also includes the subject matter according to any one of examples 1 or 2, above.

The method includes assigning the language proficiency level associated with the subset of the plurality of prompts to the user in response to determining that the user provided a successful response to a threshold number of prompts in the subset of the plurality of prompts. The preceding subject matter of this paragraph characterizes example 4 of the present disclosure, wherein example 4 also includes the subject matter according to any one of examples 1-3, above.

The method includes presenting one or more baseline prompts of the plurality of prompts to the user to determine a language proficiency level of the user according to the user's responses to the baseline prompts and dynamically selecting one or more additional prompts to present to the user based on the determined language proficiency level, the one or more additional prompts selected to diagnose the user's proficiency of one or more elements of the language. The preceding subject matter of this paragraph characterizes example 5 of the present disclosure, wherein example 5 also includes the subject matter according to any one of examples 1-4, above.

The method includes assigning the language proficiency level to the user in response to determining that the user provided a successful response. The preceding subject matter of this paragraph characterizes example 6 of the present disclosure, wherein example 6 also includes the subject matter according to any one of examples 1-5, above.

The response comprises a voice response and the one or more characteristics of the response include the user's pronunciation of one or more syllables of the voice response, each syllable comprised of one or more phonemes. The preceding subject matter of this paragraph characterizes example 7 of the present disclosure, wherein example 7 also includes the subject matter according to any one of examples 1-6, above.

A score is assigned to a syllable based on the user's pronunciation of the one or more phonemes. The preceding subject matter of this paragraph characterizes example 8 of the present disclosure, wherein example 8 also includes the subject matter according to any one of examples 1-7, above.

The method includes determining that the user's pronunciation of the syllable is successful in response to the score assigned to the syllable satisfying a threshold syllable score. The preceding subject matter of this paragraph characterizes example 9 of the present disclosure, wherein example 9 also includes the subject matter according to any one of examples 1-8, above.

The method includes aggregating each score assigned to each syllable of the voice response and determining that the user's pronunciation of the voice response is successful in response to the aggregated score satisfying a threshold response score. The preceding subject matter of this paragraph characterizes example 10 of the present disclosure, wherein example 10 also includes the subject matter according to any one of examples 1-9, above.

The method includes using one or more machine learning processes to determine the one or more scores for the response based on one or more historical responses. The preceding subject matter of this paragraph characterizes example 11 of the present disclosure, wherein example 11 also includes the subject matter according to any one of examples 1-10, above.

The prompt comprises one of an audio prompt, a video prompt, and a text prompt. The preceding subject matter of this paragraph characterizes example 12 of the present disclosure, wherein example 12 also includes the subject matter according to any one of examples 1-11, above.

The prompt is selected from one or more different prompt types, which are selected from the group consisting of an elicited imitation, an open response, an elicited dictation, and a story retelling.

Further described herein is an apparatus for adaptive language learning. The apparatus comprises a processor and a memory storing code executable by the processor. The executable code includes code to receive a response from a user in response to a first prompt. The first prompt is intended to test one or more language skills of the user. The executable code includes code to analyze one or more characteristics of the response to determine one or more scores for the response. The one or more scores are determined based on a comparison of the one or more characteristics of the response to a predefined response to the prompt. The executable code includes code to determine a language proficiency for the user based on the determined one or more scores. The executable code includes code to dynamically select a second prompt to present to the user. The second prompt is selected based on the user's language proficiency and intended to further test the user's one or more language skills. The preceding subject matter of this paragraph characterizes example 14 of the present disclosure.

The prompt is one of a plurality of prompts that comprise a language proficiency test. The preceding subject matter of this paragraph characterizes example 15 of the present disclosure, wherein example 15 also includes the subject matter of example 14, above.

A predefined subset of the plurality of prompts is associated with a predefined language proficiency level. The preceding subject matter of this paragraph characterizes example 16 of the present disclosure, wherein example 16 also includes the subject matter of examples 14 or 15, above.

The code is further executable by the processor to assign the language proficiency level associated with the subset of the plurality of prompts to the user in response to determining that the user provided a successful response to a threshold number of prompts in the subset of the plurality of prompts. The preceding subject matter of this paragraph characterizes example 17 of the present disclosure, wherein example 17 also includes the subject matter according to any one of examples 14-16, above.

The code is further executable by the processor to present one or more baseline prompts of the plurality of prompts to the user to determine a language proficiency level of the user according to the user's responses to the baseline prompts and dynamically select one or more additional prompts to present to the user based on the determined language proficiency level, the one or more additional prompts selected to diagnose the user's proficiency of one or more elements of the language. The preceding subject matter of this paragraph characterizes example 18 of the present disclosure, wherein example 18 also includes the subject matter according to any one of examples 14-17, above.

The code is further executable by the processor to assign the language proficiency level to the user in response to determining that the user provided a successful response. The preceding subject matter of this paragraph characterizes example 19 of the present disclosure, wherein example 19 also includes the subject matter according to any one of examples 14-18, above.

Further described herein is a computer program product for adaptive language learning. The computer program product comprises a computer readable storage medium having program code embodied therein. The program code readable/executable by a processor for receiving a response from a user in response to a first prompt. The first prompt intended to test one or more language skills of the user. The program code readable/executable by a processor for analyzing one or more characteristics of the response to determine one or more scores for the response. The one or more scores determined based on a comparison of the one or more characteristics of the response to a predefined response to the prompt. The program code readable/executable by a processor for determining a language proficiency for the user based on the determined one or more scores. The program code readable/executable by a processor for dynamically selecting a second prompt to present to the user. The second prompt is selected based on the user's language proficiency and intended to further test the user's one or more language skills.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims or may be learned by the practice of the subject matter as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Figure 1:
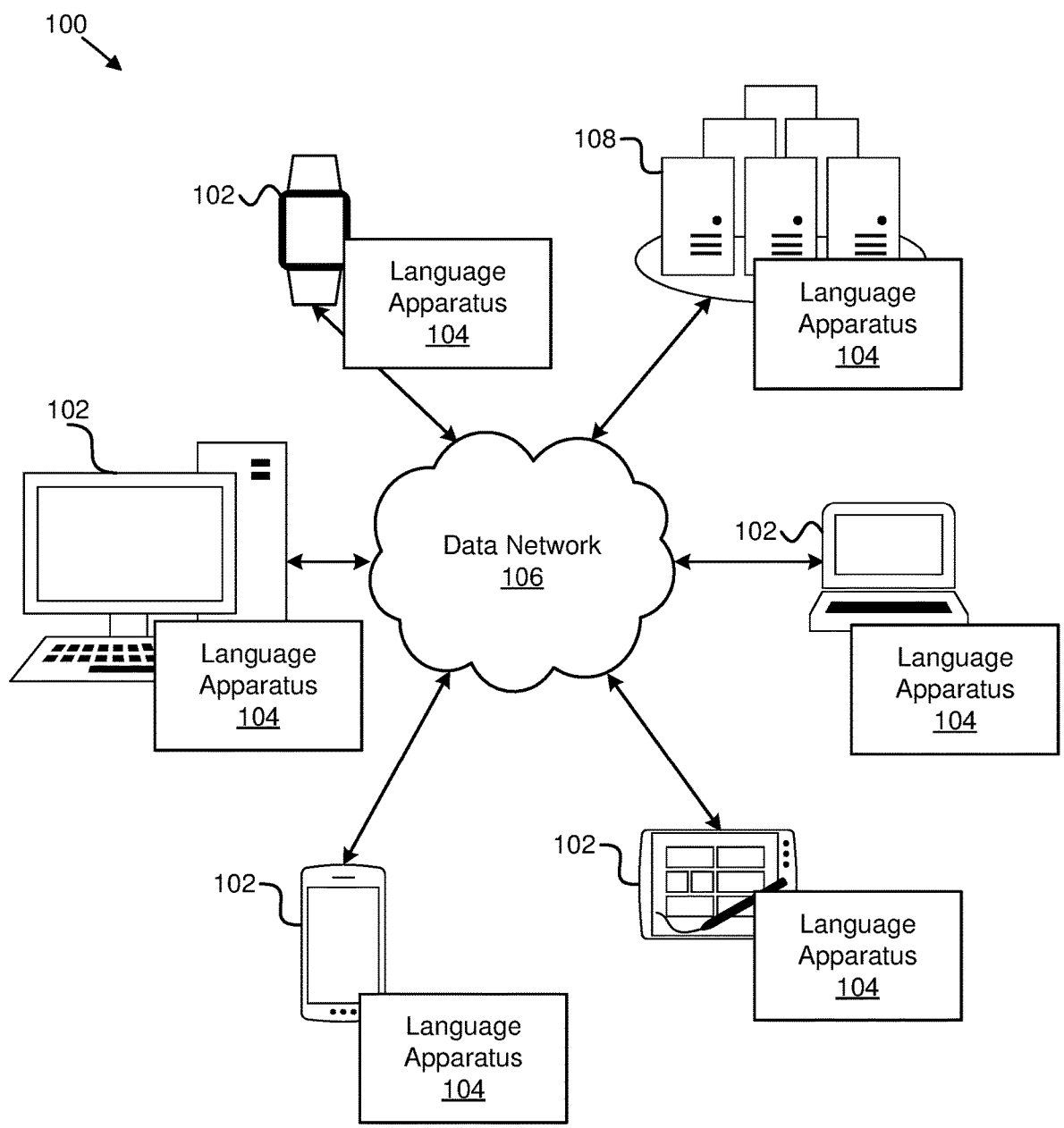
FIG. 1 is a schematic block diagram illustrating one embodiment of a system in accordance with the subject matter disclosed herein.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the program code may be stored and/or propagated on in one or more computer readable medium(s).

The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program instructions may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

FIG. 1 is a schematic block diagram illustrating one embodiment of a system 100 for language learning. In one embodiment, the system 100 includes one or more information handling devices 102, one or more language apparatuses 104, one or more data networks 106, and one or more servers 108. In certain embodiments, even though a specific number of information handling devices 102, language apparatuses 104, data networks 106, and servers 108 are depicted in FIG. 1, one of skill in the art will recognize, in light of this disclosure, that any number of information handling devices 102, language apparatuses 104, data networks 106, and servers 108 may be included in the system 100.

In one embodiment, the system 100 includes one or more information handling devices 102. The information handling devices 102 may include one or more of a desktop computer, a laptop computer, a tablet computer, a smart phone, a security system, a set-top box, a gaming console, a smart TV, a smart watch, a fitness band or other wearable activity tracking device, an optical head-mounted display (e.g., a virtual reality headset, smart glasses, or the like), a High-Definition Multimedia Interface ("HDMI") or other electronic display dongle, a personal digital assistant, a digital camera, a video camera, or another computing device comprising a processor (e.g., a central processing unit ("CPU"), a processor core, a field programmable gate array ("FPGA") or other programmable logic, an application specific integrated circuit ("ASIC"), a controller, a microcontroller, and/or another semiconductor integrated circuit device), a volatile memory, and/or a non-volatile storage medium.

In certain embodiments, the information handling devices 102 are communicatively coupled to one or more other information handling devices 102 and/or to one or more servers 108 over a data network 106, described below. The information handling devices 102, in a further embodiment, are configured to execute various programs, program code, applications, instructions, functions, and/or the like, which may access, store, download, upload, and/or the like data located on one or more servers 108. The information handling devices 102 may include one or more hardware and software components for recording, receiving, processing, analyzing, and/or the like speech and languages. For example, the information handling devices 102 may include microphones or other sensors for capturing audio spoken by various users, software and/or hardware for processing and analyzing the captured audio, and/or the like.

In one embodiment, the language apparatus 104 is configured to calculate a user's proficiency in a language using one or more prompts intended to elicit a response from the user in the language. Furthermore, the language apparatus 104 can adapt the prompts on the fly, in real-time, based on the user's previous responses to increase or decrease the difficulty and pinpoint the user's proficiency level. The language apparatus 104 can also dynamically, in real time, adjust the prompts to diagnose or focus on particular areas of weakness or other specific elements of the language that the user needs to work on to increase the user's proficiency in the language. In this manner, the language apparatus 104 can provide immediate and accurate feedback without the inconsistencies and biases that may arise with language learning systems directed by humans. Furthermore, the language apparatus can efficiently determine a more accurate proficiency level for the user by dynamically adapting the language prompts based on the user's previous responses. The language apparatus 104, including its various sub-modules, may be located on one or more information handling devices 102 in the system 100, one or more servers 108, one or more network devices, and/or the like. The language apparatus 104 is described in more detail below with reference to FIGS. 2 and 3.

In various embodiments, the language apparatus 104 may be embodied as a hardware appliance that can be installed or deployed on an information handling device 102, on a server 108, or elsewhere on the data network 106. In certain embodiments, the language apparatus 104 may include a hardware device such as a secure hardware dongle or other hardware appliance device (e.g., a set-top box, a network appliance, or the like) that attaches to a device such as a laptop computer, a server 108, a tablet computer, a smart phone, a security system, or the like, either by a wired connection (e.g., a universal serial bus ("USB") connection) or a wireless connection (e.g., Bluetooth®, Wi-Fi, near-field communication ("NFC"), or the like); that attaches to an electronic display device (e.g., a television or monitor using an HDMI port, a DisplayPort port, a Mini DisplayPort port, VGA port, DVI port, or the like); and/or the like. A hardware appliance of the language apparatus 104 may include a power interface, a wired and/or wireless network interface, a graphical interface that attaches to a display, and/or a semiconductor integrated circuit device as described below, configured to perform the functions described herein with regard to the language apparatus 104.

The language apparatus 104, in such an embodiment, may include a semiconductor integrated circuit device (e.g., one or more chips, die, or other discrete logic hardware), or the like, such as a field-programmable gate array ("FPGA") or other programmable logic, firmware for an FPGA or other programmable logic, microcode for execution on a microcontroller, an application-specific integrated circuit ("ASIC"), a processor, a processor core, or the like. In one embodiment, the language apparatus 104 may be mounted on a printed circuit board with one or more electrical lines or connections (e.g., to volatile memory, a non-volatile storage medium, a network interface, a peripheral device, a graphical/display interface, or the like). The hardware appliance may include one or more pins, pads, or other electrical connections configured to send and receive data (e.g., in communication with one or more electrical lines of a printed circuit board or the like), and one or more hardware circuits and/or other electrical circuits configured to perform various functions of the language apparatus 104.

The semiconductor integrated circuit device or other hardware appliance of the language apparatus 104, in certain embodiments, includes and/or is communicatively coupled to one or more volatile memory media, which may include but is not limited to random access memory ("RAM"), dynamic RAM ("DRAM"), cache, or the like. In one embodiment, the semiconductor integrated circuit device or other hardware appliance of the language apparatus 104 includes and/or is communicatively coupled to one or more non-volatile memory media, which may include but is not limited to: NAND flash memory, NOR flash memory, nano random access memory (nano RAM or NRAM), nanocrystal wire-based memory, silicon-oxide based sub-10 nanometer process memory, graphene memory, Silicon-Oxide-Nitride-Oxide-Silicon ("SONOS"), resistive RAM ("RRAM"), programmable metallization cell ("PMC"), conductive-bridging RAM ("CBRAM"), magneto-resistive RAM ("MRAM"), dynamic RAM ("DRAM"), phase change RAM ("PRAM") or "PCM"), magnetic storage media (e.g., hard disk, tape), optical storage media, or the like.

The data network 106, in one embodiment, includes a digital communication network that transmits digital communications. The data network 106 may include a wireless network, such as a wireless cellular network, a local wireless network, such as a Wi-Fi network, a Bluetooth® network, a near-field communication ("NFC") network, an ad hoc network, and/or the like. The data network 106 may include a wide area network ("WAN"), a storage area network ("SAN"), a local area network (LAN), an optical fiber network, the internet, or other digital communication network. The data network 106 may include two or more networks. The data network 106 may include one or more servers, routers, switches, and/or other networking equipment. The data network 106 may also include one or more computer readable storage media, such as a hard disk drive, an optical drive, non-volatile memory, RAM, or the like.

The wireless connection may be a mobile telephone network. The wireless connection may also employ a Wi-Fi network based on any one of the Institute of Electrical and Electronics Engineers (IEEE) 802.11 standards. Alternatively, the wireless connection may be a Bluetooth® connection. In addition, the wireless connection may employ a Radio Frequency Identification (RFID) communication including RFID standards established by the International Organization for Standardization (ISO), the International Electrotechnical Commission (IEC), the American Society for Testing and Materials® (ASTM®), the DASH7™ Alliance, and EPCGlobal™.

Alternatively, the wireless connection may employ a ZigBee® connection based on the IEEE 802 standard. In one embodiment, the wireless connection employs a Z-Wave® connection as designed by Sigma Designs®. Alternatively, the wireless connection may employ an ANT® and/or ANT+® connection as defined by Dynastream® Innovations Inc. of Cochrane, Canada.

The wireless connection may be an infrared connection including connections conforming at least to the Infrared Physical Layer Specification (IrPHY) as defined by the Infrared Data Association® (IrDA®). Alternatively, the wireless connection may be a cellular telephone network communication. All standards and/or connection types include the latest version and revision of the standard and/or connection type as of the filing date of this application.

The one or more servers 108, in one embodiment, may be embodied as blade servers, mainframe servers, tower servers, rack servers, and/or the like. The one or more servers 108 may be configured as mail servers, web servers, application servers, FTP servers, media servers, data servers, web servers, file servers, virtual servers, and/or the like. The one or more servers 108 may be communicatively coupled (e.g., networked) over a data network 106 to one or more information handling devices 102. The one or more servers 108 may store programs and/or data associated with language and/or speech processing, language recognition, and/or the like.

Figure 2:
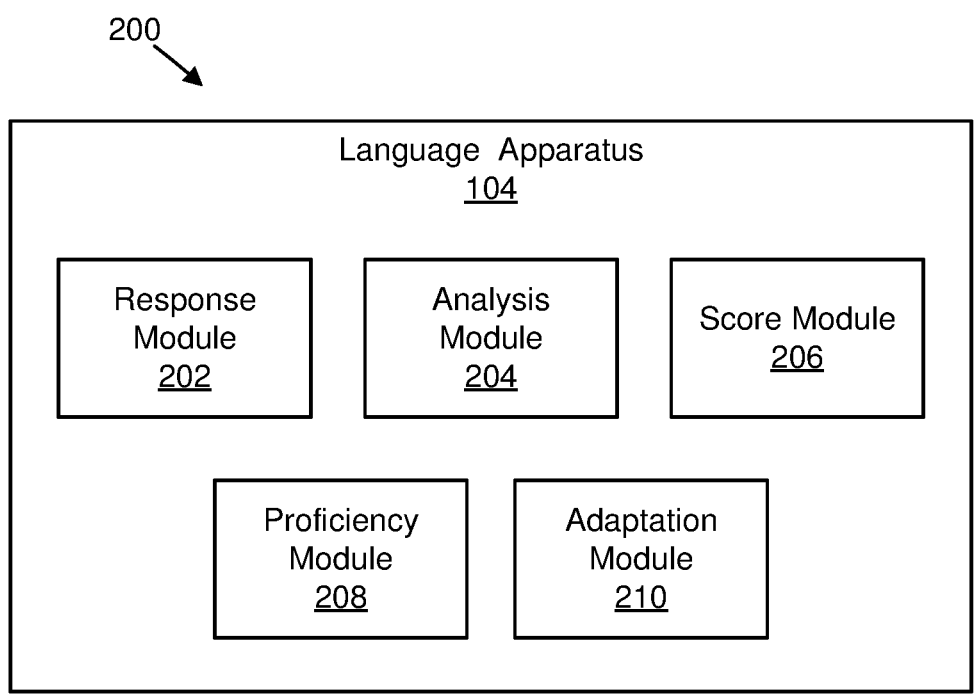
FIG. 2 is a schematic block diagram illustrating one embodiment of an apparatus in accordance with the subject matter disclosed herein.

FIG. 2 is a schematic block diagram illustrating one embodiment of an apparatus 200 for language learning. In one embodiment, the apparatus 200 includes an embodiment of a language apparatus 104. The language apparatus 104, in certain embodiments, includes one or more of a response module 202, an analysis module 204, a score module 206, and a proficiency module 208, which are described in more detail below.

The response module 202, in one embodiment, receives a response from a user in response to a prompt being presented to the user. In some embodiments, the prompt is intended to test one or more of the user's language skills, and may be presented as an audio prompt, a video prompt, a text prompt, and/or the like. For instance, the prompt may include a phrase that the user repeats in the language that is being tested (e.g., an elicited imitation where the user listens and repeats what he/she hears); a question that the user provides an answer to in the language that is being tested (e.g., an open response to an open ended question); a phrase that the user repeats by writing the phrase in the language that is being tested (e.g., an elicited dictation where the user listens and writes down what he/she hears); and/or a paragraph that the user reads and summarizes, by speaking or writing, into his/her own words in the language that is being tested (e.g., a story retelling where the user reads a paragraph of a story and retells the story in his/her own words). Thus, the user's response to the prompt may be a voice or video response where the user says words or phrases in the language that is being tested and/or a written response where the user writes words or phrases in the language that is being tested. In embodiments where video prompts are provided, the video prompts may include clips of pre-recorded videos such as movies, TV programs, Internet videos, and/or the like, which may include authentic sources, e.g., natural language speakers or speakers who are native speakers of the tested language.

The response module 202, in such an embodiment, may capture and record voice responses using a microphone, a video camera, or other audio/video capture device or sensor. Similarly, the response module 202 may capture and store written responses provided using a word processing application, or other text entry application. The response module 202, in certain embodiments, determines one or more characteristics of the user's responses. For instance, the response module 202 may detect individual phonemes, morphemes, or sounds, syllables, accents, emphases, parts of speech, and/or the like within a voice or text response.

In certain embodiments, the response module 202 uses natural language processing functions, routines, processes, and/or the like to analyze a user's response, such as text, open, or free responses, e.g., a transcription of user's voice response, typing a sentence, a paragraph, or the like. As used herein, natural language processing refers to the process of analyzing or parsing a user response using speech recognition, natural-language understanding, natural-language generation, and/or the like to identify the one or more characteristics of the response such as syllables, phonemes, morphemes, parts of speech (e.g., verbs, nouns, and/or the like), and/or the like.

The analysis module 204, in one embodiment, analyzes one or more characteristics of the user's response in light of, based on, as a function of, and/or the like a predefined response to the prompt. The analysis module 204 may compare one or more characteristics of a response to a predefined response to the prompt. For instance, the analysis module 204 may compare how the user pronounces certain syllables to how the syllables should sound based on a predefined response. For example, if the user is prompted to repeat "I used to love antique cars," the analysis module 204 may compare each phoneme and/or syllable of the user's voice response to a predefined recording of the phrase "I used to love antique cars." Similarly, the analysis module 204 may compare a user's written response to a prompt against a predefined response to determine the user's proficiency with vocabulary, spelling, grammar, punctuation, and/or the like.

In certain embodiments, the analysis module 204 performs speech recognition, speech analysis, text analysis, natural language processing, machine learning, artificial intelligence, and/or the like to determine a level of similarity between the user's response and the predefined response. For example, the analysis module 204 may perform speech analysis on a user's voice response to determine a speech or sound signature for each phoneme, sound, syllable, or the like of the user's voice response, and compare the signature to corresponding signatures of a predefined response.

The score module 206, in one embodiment, assigns a score to the user's response and/or to each characteristic of the user's response based on the comparison with the predefined response dynamically, in real-time, and/or the like. For example, the score module 206 may assign a score to each syllable of a user's voice response as a function of how similar the speech signature of each syllable is compared to the speech signature of each corresponding syllable of a predefined voice response. For instance, if the analysis module 204 determines that a sound or syllable of the user's voice response is within a threshold range of the correspond sound or syllable of the predefined response, then the score module 204 may assign that particular sound or syllable a score that indicates how similar a sound or syllable of the user's voice response is to the predefined response.

The score module 206, in one embodiment, assigns a quantitative value to the user's response such as a percentage that indicates an accuracy of the user's response compared to the predefined response, a rating (e.g., on a scale of 1 to 10), and/or the like. The score module 206, in another embodiment, assigns a qualitative value to the user's response such as high, medium, low, or the like.

In certain embodiments, the score module 206 assigns a score to each syllable of a user's voice response based on the accuracy with which the user pronounces each sound of the syllable. For instance, the analysis module 204 may compare sounds or phonemes of the user's voice response to the sounds or phonemes of the predefined response to determine whether the user is accurately pronouncing the phonemes. The accuracy may be determined according to how similar the user's pronunciation of the phonemes is compared to the pronunciation of the phonemes of the predefined voice response, which may be based on a comparison of the speech signatures for each phoneme. The score module 206 then assigns the syllable a score based on the scores assigned to each phoneme that comprises the syllable. For example, the score module 206 may aggregate phoneme scores, average phoneme scores, and/or the like.

The score module 206, in a further embodiment, identifies syllables that the user pronounced accurately. The score module 206, for example, may identify an accurately pronounced syllable in response to the score assigned to the syllable satisfying a predetermined threshold syllable score. In some embodiments, the threshold syllable score is 60% or greater.

In one embodiment, the score module 206 determines a score for an entire phrase, sentence, word, or the like, based on the scores assigned to each syllable. For example, the score module 206 may aggregate, e.g., sum, average, and/or the like the scores assigned to each syllable to determine an overall score for the word, sentence, phrase, or the like. The score module 206, in certain embodiments, determines whether the word, sentence, or phrase was accurately pronounced in response to the aggregated score satisfying a threshold response score. In some embodiments, the threshold response score is 70% or greater.

In various embodiments, the score module 206 uses machine learning functions, algorithms, methods, processes, and/or the like to determine scores for the user's responses. As used herein, machine learning refers to the ability of a device, e.g., a computer to learn with data without being explicitly programmed in order to make predictions, estimates, forecasts, and/or the like based on historical relationships and trends in data. Thus, the score module 206 may utilize machine learning functions to determine scores for the user's responses and/or the characteristics of the user's responses based on previously provided and analyzed responses.

In such an embodiment, the score module 206 may utilize artificial neural networks and/or other machine learning functions to determine or estimate a score based on historical or predetermined data. For instance, in one embodiment, the artificial neural network may be trained using predefined or pre-designed responses to predefined prompts. Scores may be pre-assigned to the predefined responses so that the artificial neural network has a set of responses and associated scores to be trained with. Thereafter, when a user provides a response to a prompt, the artificial neural network may analyze the response, e.g., may process each characteristic of a response and/or the response in general, based on the historical data, to determine scores for the characteristics and/or the entire response. This provides an improvement upon conventional scoring methods that may include manually scoring a user's response, which introduces opportunities for errors, biases, and subjectivity in the scoring process. Furthermore, the scoring module 206 may score a user's response dynamically, in real-time as the user proceeds through a language test so that the user (and other modules described below) receive the score information immediately, whereas manually scoring a user's response may take minutes, hours, etc.

The proficiency module 208, in one embodiment, determines a language proficiency for the user based on the scores that the score module 206 assigns to the syllables, the word, the phrase, the sentence, and/or the like. As used herein, the proficiency may be a level or rating of how accurately or fluently a user speaks, understands, or writes a particular language. Examples of proficiencies may include categories such as expert, intermediate, novice, or the like, with varying levels within each category, e.g., mid-intermediate, etc.

In one embodiment, the prompt is associated with a proficiency level, and is designed or intended to test the user's ability to provide a response for that proficiency level. If the proficiency module 208 determines that the user's response has a score that satisfies a predetermined threshold according to the proficiency level for the prompt, then the user is assigned the proficiency level for the prompt. For example, the prompt may be rated at an expert proficiency level, and the threshold for the prompt may be 70%, meaning that the user has to achieve at least a 70% accuracy level to successfully "pass" the prompt in order to be assigned an expert proficiency level. In another example, a prompt may be rated at an intermediate proficiency level, and the threshold for the prompt may be 70%, meaning that the user has to achieve at least a 70% accuracy level to successfully "pass" the prompt in order to be assigned the intermediate proficiency level.

In certain embodiments, the prompt that is presented to the user is one of a plurality of prompts designed to determine a proficiency for the user, such as a language proficiency test that includes a plurality of different prompts. In one embodiment, the proficiency module 208 assigns a language proficiency level associated with a subset of the plurality of prompts to the user in response to determining that the user provided a successful response to a threshold number of prompts in the subset of the plurality of prompts. For example, the proficiency module 208 may associate a proficiency level, such as an intermediate level, with a set of three different prompts. In order for the user to achieve the assigned proficiency level, the proficiency module 208 may determine that the user has achieved a threshold score on one or more of the prompts, e.g., if the user's responses score at or above 70% on two out of three prompts of the set.

In such an embodiment, a plurality of sets of prompts may be presented to the user, where each set of prompts is associated with a particular proficiency level. In some embodiments, in order for the user to achieve a particular proficiency level, the user must "pass" a threshold number of prompts within each set. Thus, if there are ten proficiency levels, and therefore ten sets of prompts, with three prompts per set that are meant to differentiate for each level (so thirty prompts total), then the proficiency score may be determined by finding the highest (in terms of proficiency level) set of three prompts where the user "passed" at least two out of three prompts (e.g., were performed by the user above the threshold of 70%).

In one embodiment, the adaptation module 210 dynamically, in real-time, determines a prompt of a plurality of prompts, e.g., of a language proficiency test, to present to the user based on a proficiency score assigned to the user according to the user's response to a previous prompt. For example, if the user is given a prompt that has an intermediate proficiency level, the next prompt will be based on how well the user's response to the intermediate proficiency prompt scored. So, if the proficiency module 208 determines that the user's response score was below a threshold score for the intermediate proficiency prompt, the adaptation module 210 may determine or select a prompt that has a lower proficiency level for the following prompt.

On the other hand, if the proficiency module 208 determines that the user's response score was at or above a threshold score for the intermediate proficiency prompt, the adaptation module 210 may determine or select a prompt that has a higher proficiency level for the following prompt, and so on. In this manner, the adaptation module 210 can accurately, in a systematic manner, pinpoint the user's current proficiency level for a particular language in real-time by dynamically adjusting the prompts that are presented to the user based on the scores that the score module 206 assigns to the user's responses.

Figure 3:
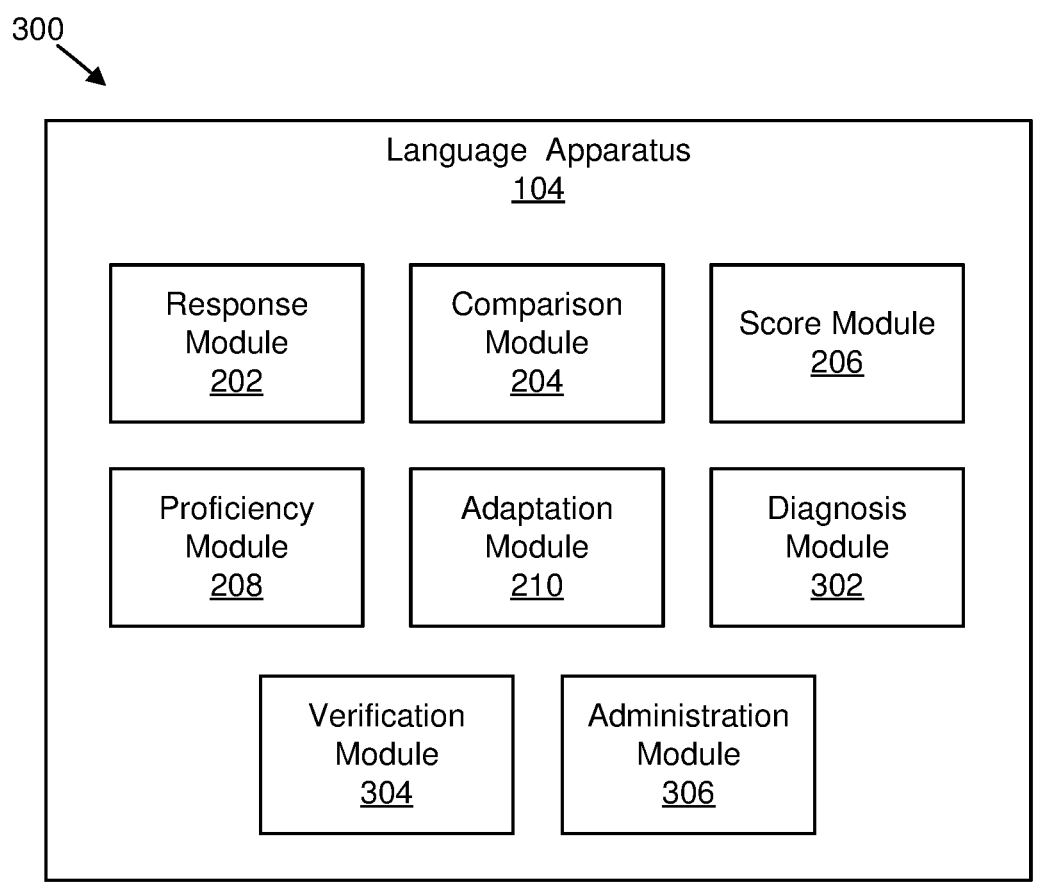
FIG. 3 is a schematic block diagram illustrating one embodiment of another apparatus in accordance with the subject matter disclosed herein.

FIG. 3 is a schematic block diagram illustrating one embodiment of another apparatus 300 for language learning. In one embodiment, the apparatus 300 includes an embodiment of a language apparatus 104. The language apparatus 104, in some embodiments, includes a response module 202, an analysis module 204, a score module 206, and a proficiency module 208, which are substantially similar to the response module 202, the analysis module 204, the score module 206, and the proficiency module 208 described above with reference to FIG. 2. Furthermore, the language apparatus 104, in one embodiment, includes a diagnosis module 302, a verification module 304, and an administration module 306, which are described in more detail below.

In one embodiment, the diagnosis module 302 presents one or more baseline prompts to the user to determine a baseline language proficiency level for the user based on the user's response to the baseline prompts. The baseline prompts may be statically selected, e.g., the diagnosis module 302 may preselect each question and present them in order. Alternatively, the diagnosis module 302 may select a baseline prompt and, based on the user's response to the baseline prompt, the adaptation module 210 may select the next prompt, and so on, to determine a baseline proficiency level for the user.

Once the baseline proficiency level is determined, the diagnosis module 302 may dynamically select one or more additional prompts that are intended to diagnose the user's proficiency of one or more elements of the language that is being tested. For instance, the diagnosis module 302 may determine that the user receives low proficiency scores with sentences that include past-tense verbs, or sentences that have a particular sound or accent, and/or the like. The diagnosis module 302 may then select one or more prompts that focus on or highlight the elements of the language that the user is struggling with. In this manner, the diagnosis module 302 can automatically, in real-time, identify areas where the user is weak or struggling, and can suggest to the user what will help the user practice and strengthen the areas where the user is weak.

For example, the diagnosis module 302 may determine that the user is struggling with past-tense irregular verbs ending in the suffix "-ed". Accordingly, the diagnosis module 302 may select and present prompts that are designed or include parts that test the user's skills as it relates to past-tense regular and irregular verbs. The diagnosis module 302 may determine the user's current proficiency score and present prompts with a difficulty at or below the current score and gradually increase the difficulty based on the user's performance.

Over time, the diagnosis module 302 may generate a mapping of which grammar, vocabulary, skills, and/or the like that the user has acquired at a certain proficiency level, and which the user has yet to master. The mapping may be used to determine what prompts to present to the user, the difficulty levels of prompts presented to the user, and/or the like.

Similarly, the diagnosis module 302 tracks a user's vocabulary by determining the frequency with which the user is able to master vocabulary words in their responses to the prompts. For example, frequently used vocabulary words, e.g., "the", "of", "an", etc., may be easier to learn whereas less frequently used words may be more difficult. The diagnosis module 302 may calculate an average, minimum, maximum, and/or the like of the words that the user gets correct in their responses to the prompts to determine a word level for the user, e.g., the average frequencies of words that the user gets correct to determine if the user should be tested on more difficult words, intermediate words, and/or the like.

The verification module 304, in one embodiment, is configured to verify that a user who is taking a language proficiency exam is the user who is supposed to be, registered to be, and/or the like the test taker for the exam. In one embodiment, the verification module 304 may initially request credentials from the user prior to starting the exam. The credentials may include a username/password combination, a PIN number, biometric data, an answer to a security question, an image of the user with picture identification, and/or the like.

Periodically, during the exam, the verification module 304 may pause the language test to prompt the user to provide some form of verification to ensure that the user taking the test is the user that is registered to take the test. For instance, the verification module 304 may prompt the user for his/her password, for an answer to a security question, for a confirmation number texted or emailed to the user, and/or the like.

In certain embodiments, the verification module 304 may activate the user's webcam to capture an image or video of the user taking the test to compare against a picture of the user that was provided when the user registered for the test. For instance, the verification module 304 may perform facial recognition or other image processing functions to compare the image of the user taking the test with the previously provided image to determine whether the user taking the test is the user that registered for the test.

If the verification module 304 determines that the user taking the test is not the same user that registered for the test, the verification module 304 may close the test, may lock the user out of the test, and/or otherwise prevent the user taking the exam from further accessing the test.

The administration module 306, in one embodiment, is configured to create a prompt, a test, and/or the like for users to create. For instance, the administration module 306 may capture one or more voice recordings, video recordings, text input, and/or the like from a user creating the test, which may be used for prompts, baseline responses to compare the test taker's responses to, and/or the like. The administration module 306 may also receive uploaded audio, video, text files, and/or the like. The administration module 306, in one embodiment, receives one or more labels, tags, and/or the like from the user that describe the difficulty of a provided prompt, difficulties of different portions of the prompt, possible scores for the prompts/portions of the prompts, and/or the like, which the score module 206 may subsequently use to score a test taker's responses.

In one embodiment, the language apparatus 104 may be located on the user's device, on a remote device, e.g., a cloud device, and/or some combination of both. In an embodiment where the language apparatus 104 is located only on the user's device, the functions of the language apparatus 104 may fully execute locally so that the device does not require a network or Internet connection. In embodiments where portions of the language apparatus 104 are located on a remote or cloud device, which may require the user's device to connect to the remote or cloud device over a network 106 to have full functionality, the language apparatus 104 may allow a user to use certain features available locally, such as taking a language proficiency test, and then upload or sync with the remote or cloud device, e.g., to provide testing scores, proficiency scores, machine learning results, and/or the like, when the user's device connects to a network 106. Thus, even though the device may not have a network connection, the user may still be able to use certain features of the language apparatus 104.

Figure 4:
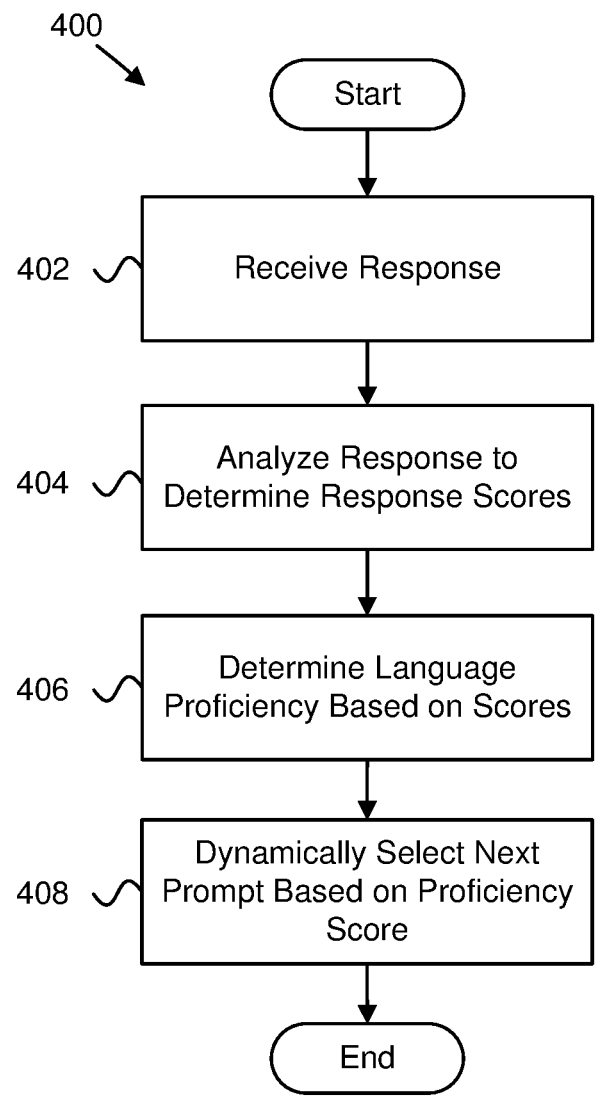
FIG. 4 is a schematic flow-chart diagram illustrating one embodiment of a method in accordance with the subject matter disclosed herein.

FIG. 4 is a schematic flow-chart diagram illustrating one embodiment of a method 400 for language learning. In one embodiment, the method 400 begins and receives 402 a response from a user in response to a prompt that is intended to test one or more language skills of the user. In a further embodiment, the method 400 analyzes 404 one or more characteristics of the response to determine one or more scores for the response. The one or more scores may be determined based on a comparison of the one or more characteristics of the response to a predefined response to the prompt. In various embodiments, the method 400 determines 406 a language proficiency for the user based on the determined one or more scores. In one embodiment, the method 400 dynamically selects 408 a second prompt to present to the user based on the user's language proficiency. The second prompt is intended to further test the user's one or more language skills, and the method 400 ends. In one embodiment, the response module 202, the analysis module 204, the score module 206, and the proficiency module 208 perform one or more steps of the method 400.

Figure 5:
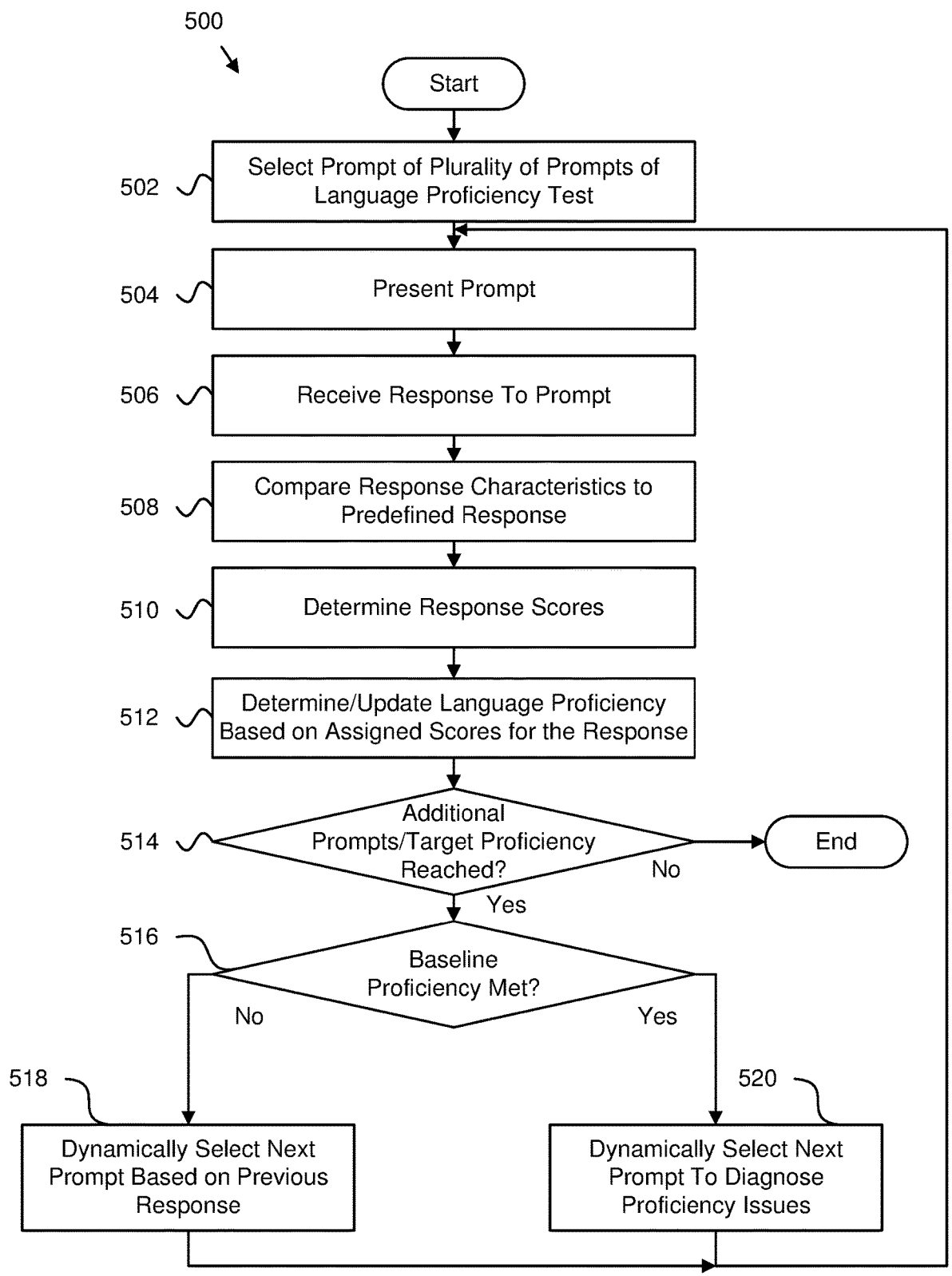
FIG. 5 is a schematic flow-chart diagram illustrating one embodiment of another method in accordance with the subject matter disclosed herein.

FIG. 5 is a schematic flow-chart diagram illustrating one embodiment of another method 500 for language learning. In one embodiment, the method 500 selects 502 a prompt of a plurality of prompts comprising a language proficiency test. The method 500, in a further embodiment, presents 504 the selected prompt to a user. In some embodiments, the method 500 receives 506 a response from the user in response to the prompt. The response may include a voice response, a video response, and/or a written response to the prompt.

In certain embodiments, the method 500 compares 508 one or more characteristics of the response to one or more corresponding characteristics of a predefined response. For example, the one or more characteristics may include sounds (phonemes), syllables, accents, emphases, grammar, punctuation, and/or the like. In some embodiments, the method 500 determines 510 a score for each characteristic of the response based on the comparison with the predefined response. For example, if the user pronounced a syllable within a threshold accuracy of the pronunciation of the same syllable of the predefined response, then the method 500 may assign the syllable a high score. The score may include a percentage, a rating on a scale, a qualitative value, and/or the like.

The method 500, in one embodiment, determines 512 and/or updates a language proficiency for the user based on the scores that are assigned to the user's response. For example, if an intermediate level prompt is presented to the user, and the user's response satisfies the threshold for the prompt, e.g., the user's response satisfies a 70% accuracy threshold, then the method 500 may assign intermediate proficiency level to the user. The method 500, in a further embodiment, determines 514 whether there are additional prompts to present to the user and/or whether the user has attained a target proficiency level. If so, the method 500 ends.

Otherwise, the method 500 determines 516 whether the user has achieved a baseline proficiency. If not, the method 500 dynamically, in real-time, selects 518 the next prompt from the plurality of prompts based on the proficiency of the user's response to a previous prompt. For example, if the method 500 determines that the proficiency of the user's response to a prompt is below a threshold proficiency level, then the method 500 may dynamically select 518 an easier prompt for the next prompt that is presented to the user. Alternatively, if the method 500 determines that the proficiency of the user's response to a prompt is above a threshold proficiency level, then the method 500 may dynamically select 518 a more difficult prompt for the next prompt that is presented to the user, and so on, until an accurate proficiency level for the user can be determined.

If the method 500 determines 516 that the user has achieved a baseline proficiency, the method 500 dynamically, in real-time, selects 520 the next prompt from the plurality of prompts to diagnose one or more issues that the user may have with various elements of the language that is being tested. For instance, if the user is having a difficult time pronouncing certain sounds, the method 500 may select 520 a prompt that will help the user focus on and practice pronouncing the difficult sounds. Similarly, if the user is having a difficult time using future-tense verbs, the method 500 may select 520 a prompt that will help the user focus on and practice using future-tense verbs, and so on. In certain embodiments, the response module 202, the analysis module 204, the score module 206, the proficiency module 208, the adaptation module 210, and the diagnosis module 302 perform one or more steps of the method 500.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
    receiving, by a processor, a voice response from a user in response to a first prompt, the first prompt intended to test one or more language skills of the user during a language assessment;
    determining, by the processor, a level of similarity between each syllable of the user's response and a corresponding syllable of a predefined response by comparing a speech signature for each syllable of the response to a speech signature for each corresponding syllable of the predefined response and determining a threshold range corresponding to the determined level of similarity;
    assigning, by the processor, one or more scores to each syllable of the response as a function of the threshold range corresponding to the determined level of similarity for each syllable relative to a predefined syllable threshold level;
    determining, by the processor, a language proficiency for each of different elements of speech of the user's response based on the one or more scores for each of the syllables of the user's response, the different elements of speech of the user's response comprising words, sentences, and/or phrases associated with a grammatical property for a language that is being tested, wherein a language proficiency for a particular part of the user's response is determined according to an aggregation of the scores for the syllables that form the particular part of the user's response;
    dynamically selecting, by the processor, a second prompt to present to the user, the second prompt selected based on the user's language proficiency of the different elements of speech of the user's response and intended to further test the elements of speech of the language being tested where the user's proficiency level does not satisfy a predetermined threshold until the determined language proficiency level for the user satisfies the predetermined threshold; and verifying, during the language assessment, that the user taking the language assessment is the user authorized for the language assessment by pausing the language assessment and prompting the user for information to verify that the user is authorized to take the language assessment.

2. The method of claim 1, wherein the prompt is one of a plurality of prompts that comprise a language proficiency test.

3. The method of claim 2, wherein a predefined subset of the plurality of prompts is associated with a predefined language proficiency level.

4. The method of claim 3, further comprising assigning the language proficiency level associated with the subset of the plurality of prompts to the user in response to determining that the user provided a successful response to a threshold number of prompts in the subset of the plurality of prompts.

5. The method of claim 2, further comprising:
presenting one or more baseline prompts of the plurality of prompts to the user to determine a language proficiency level of the user according to the user's responses to the baseline prompts; and
dynamically selecting one or more additional prompts to present to the user based on the determined language proficiency level, the one or more additional prompts selected to diagnose the user's proficiency of one or more elements of the language.

6. The method of claim 5, further comprising generating a mapping of the elements of the language that the user has acquired at a certain proficiency level, the one or more additional prompts selected based on the generated mapping.

7. The method of claim 5, further comprising tracking the user's vocabulary by determining the frequency with which the user is able to master vocabulary words in their responses to the prompts and calculating a measurement of the word level proficiency for the user based on an accuracy with which the user gets words correct in responses to prompts.

8. The method of claim 2, further comprising assigning the language proficiency level to the user in response to determining that the user provided a successful response.

9. The method of claim 1, further comprising determining that the user's pronunciation of the syllable is successful in response to the score assigned to the syllable satisfying a threshold syllable score.

10. The method of claim 9, further comprising determining that the user's pronunciation of the voice response is successful in response to the aggregated score satisfying a threshold response score.

11. The method of claim 1, further comprising using one or more machine learning processes to determine the one or more scores for the response based on one or more historical responses.

12. The method of claim 1, wherein the prompt comprises one of an audio prompt, a video prompt, and a text prompt.

13. The method of claim 1, wherein the prompt is selected from one or more different prompt types, the one or more different prompt types selected from the group consisting of:
an elicited imitation;
an open response;
an elicited dictation; and
a story retelling.

14. An apparatus, comprising:
a processor;
a memory storing code executable by the processor to:
receive a voice response from a user in response to a first prompt, the first prompt intended to test one or more language skills of the user during a language assessment;
determine a level of similarity between each syllable of the user's response and a corresponding syllable of a predefined response by comparing a speech signature for each syllable of the response to a speech signature for each corresponding syllable of the predefined response and determining a threshold range corresponding to the determined level of similarity;
assign one or more scores to each syllable of the response as a function of the threshold range corresponding to the determined level of similarity for each syllable relative to a predefined syllable threshold level;
determine a language proficiency for each of different parts of the user's response based on the one or more scores for each of the syllables of the user's response, the different parts of the user's response comprising words, sentences, and/or phrases, wherein a language proficiency for a particular part of the user's response is determined according to an aggregation of the scores for the syllables that form the particular part of the user's response;
dynamically select a second prompt to present to the user, the second prompt selected based on the user's language proficiency of the different parts of the user's response and intended to further test the user's one or more language skills until a determined language proficiency level for the user satisfies a predetermined threshold; and
verify, during the language assessment, that the user taking the language assessment is the user authorized for the language assessment by pausing the language assessment and prompting the user for information to verify that the user is authorized to take the language assessment.

15. The apparatus of claim 14, wherein the prompt is one of a plurality of prompts that comprise a language proficiency test.

16. The apparatus of claim 15, wherein a predefined subset of the plurality of prompts is associated with a predefined language proficiency level.

17. The apparatus of claim 16, wherein the code is further executable by the processor to assign the language proficiency level associated with the subset of the plurality of prompts to the user in response to determining that the user provided a successful response to a threshold number of prompts in the subset of the plurality of prompts.

18. The apparatus of claim 15, wherein the code is further executable by the processor to:
present one or more baseline prompts of the plurality of prompts to the user to determine a language proficiency level of the user according to the user's responses to the baseline prompts; and
dynamically select one or more additional prompts to present to the user based on the determined language proficiency level, the one or more additional prompts selected to diagnose the user's proficiency of one or more elements of the language.

19. The apparatus of claim 15, wherein the code is further executable by the processor to assign the language proficiency level to the user in response to determining that the user provided a successful response.

20. A computer program product comprising a computer readable storage medium having program code embodied therein, the program code readable/executable by a processor for:
- receiving a voice response from a user in response to a first prompt, the first prompt intended to test one or more language skills of the user during a language assessment;
- determining a level of similarity between each syllable of the user's response and a corresponding syllable of a predefined response by comparing a speech signature for each syllable of the response to a speech signature for each corresponding syllable of the predefined response and determining a threshold range corresponding to the determined level of similarity;
- assigning one or more scores to each syllable of the response as a function of the threshold range corresponding to the determined level of similarity for each syllable relative to a predefined syllable threshold level;
- determining a language proficiency for each of different elements of speech of the user's response based on the one or more scores for each of the syllables of the user's response, the different elements of speech of the user's response comprising words, sentences, and/or phrases associated with a grammatical property for a language that is being tested, wherein a language proficiency for a particular part of the user's response is determined according to an aggregation of the scores for the syllables that form the particular part of the user's response;
- dynamically selecting, by the processor, a second prompt to present to the user, the second prompt selected based on the user's language proficiency of the different elements of speech of the user's response and intended to further test the elements of speech of the language being tested where the user's proficiency level does not satisfy a predetermined threshold until the determined language proficiency level for the user satisfies the predetermined threshold; and
- verifying, during the language assessment, that the user taking the language assessment is the user authorized for the language assessment by pausing the language assessment and prompting the user for information to verify that the user is authorized to take the language assessment.

* * * * *